:

3,549,648
CERTAIN 1,2,3,4,9,9 - HEXACHLORO - 1,4,4a,5,6,7,
8,8a - OCTAHYDRO - 1,4 - METHANONAPHTHA-
LENE-6,7-DICARBOXIMIDES
Carleton W. Roberts, Midland, and Gale D. Travis, Shepherd, Mich., assignors to The Dow Chemical Company, Midland, Mich., a corporation of Delaware
No Drawing. Continuation-in-part of application Ser. No. 434,709, Feb. 23, 1965. This application July 1, 1968, Ser. No. 741,325
Int. Cl. C07d 31/40
U.S. Cl. 260—295                             5 Claims

ABSTRACT OF THE DISCLOSURE

Substituted 1,2,3,4,9,9-hexachloro-1,4,4a,5,6,7,8,8a-octahydro-1,4, - methanonaphthalene - 6,7 - dicarboximides bearing a heterocyclic substituent such as pyridyl, thiazolyl or tetrazolyl on the imide nitrogen are novel compounds useful as parasiticides for the control of insects, mites and mollusks.

CROSS-REFERENCE TO RELATED APPLICATION

This is a continuation-in-part of our copending application, Ser. No. 434,709, filed Feb. 23, 1965, now Pat. No. 3,440,248 dated Apr. 22, 1969.

SUMMARY OF THE INVENTION

The present invention is concerned with chlorinated methanonaphthalene compounds and is particularly directed to the novel substituted 1,2,3,4,9,9-hexachloro-1,4,-4a,5,6,7,8,8a - octahydro - 1,4-methanonapthalene - 6,7,-dicarboximides bearing a heterocyclic substituent such as pridyl, thiazolyl or tetrazolyl on the imide nitrogen. The new compounds may be represented by the formula

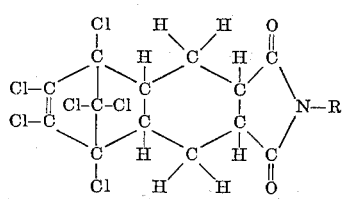

wherein R represents pyridyl, 2-thiazolyl or 5-tetrazolyl.

The products of the present invention are normally solids, somewhat soluble in various organic solvents and of low solubility in water. The novel products are useful as parasiticides.

The compounds of the invention may be prepared by reacting 1,2,3,4,9,9 - hexachloro - 1,4,4a,5,6,7,8,8a-octahydro - 1,4,-methanonaphthalene-6,7-dicarboxylic anhydride with an amino-heterocyclic compound, such as an aminopyridine, 5-aminotetrazole or 2-aminothiazole. The reaction of the anhydride reactant and the aminoheterocyclic reactant is in all instances conveniently carried out in the presence of an inert liquid as a reaction medium. The employment of such medium, or the identity of the inert liquid employed, is not critical; however, the use of the medium provides for the dispersion and contacting of the reactants, and is preferred. Representative inert liquids include hydrocarbons, such as benzene, hexane, and toluene; chlorinated hyrocarbons, such as dichloromethane; ethers; ketones, such as acetone; and N,N-disubstituted amides, such as dimethylformamide. Preferably, acetone or dimethylformamide is employed as inert liquid reaction medium.

The reaction of the anhydride reactant and the amine reactant goes forward at temperatures over a wide range, for example, from about 80° C. to 200° C. The use of temperatures in excess of about 90° C. results in the predominant preparation of the desired products. The reaction goes forward under atmospheric pressures of a wide range; however, no advantage ordinarily results from the use of subatmospheric or superatmospheric pressures, and therefore, the preparation is ordinarily carried out at atmospheric pressures.

The amounts of the reactants to be employed are not critical, some of the desired product resulting when the reactants are employed in any amounts. However, in the preparation of said product the reactants are consumed in amounts which represent equimolecular proportions. Thus, it is usually preferred to supply the anhydride reactant and the amine reactant in amounts representing equimolecular proportions. The reaction ordinarily goes forward rapidly, with the preparation of the desired product in the reaction mixture and in good yield. Sometimes it is preferred to permit the reaction mixture to stand for a period of time, in order to assure completion of the reaction. Following the completion of the reaction, or when the reactants have been contacted for as long a period of time as is desired, the product-containing reaction mixture can be employed for the useful purposes of the present invention. Alternatively, the product can be separated from the reaction mixture by conventional separation procedures, such as, for example, filtration, decantation, evaporation under subatmospheric pressure of the inert liquid reaction medium, and the like.

The separated product can be employed for the useful purposes of the present invention, or can be purified by conventional procedures before being so employed. Representative purification procedures include washing with an appropriate liquid which is a solvent for impurities but not for the product; recrystallization and the like.

DESCRIPTION OF PREFERRED EMBODIMENTS

The following examples illustrate the invention but are not to be construed as limiting the same.

Example 1

42.5 grams (0.1 mole) of 1,2,3,4,9,9-hexachloro-1,4,4a-5,6,7,8,8a-octahydro-1,4-methanonaphthalene - 6,7 - dicarboxylic anhydride and 9.41 grams (0.1 mole) of 2-aminopyridine are dispersed together in 50 milliliters of dimethylformamide in a flask equipped with a reflux condenser. The resulting mixture is heated to the reflux temperature and maintained under reflux for 4 hours. The reaction mixture is then cooled and poured into 400 milliliters of an ice-water mixture to precipitate the crude product. The resulting aqueous mixture is held at room temperature for 18 hours. The solid product is then separated by filtration and dried under vacuum to obtain the crude product in the form of a glass. The latter is recrystallized from toluene to obtain the N - (2-pyridyl) - 1,2,3,4,9,9-hexachloro-1,4,4a,5,6,7,8,8a - octahydro - 1,4-methanonaphthalene - 6,7 - dicarboximide as a solid, melting at 130°– 135° C.

The foregoing procedure is repeated employing 3-aminopyridine or 4-aminopyridine in place of the 2-aminopyridine reactant to produce N - (3-pryidyl) - 1,2,3,4,9,9-hexachloro-1,4,4a,5,6,7,8,8a - octahydro - 1,4-napthalene-6,7- dicarboximide and N - (4-pyridyl) - 1,2,3,4,9,9-hexachloro - 1,4,4a,5,6,7,8,8a - octahydro - 1,4 - methanonaphthalene-6,7-dicarboximide products, respectively each characterized by a molecular weight of 501.

Example 2

Following the procedural steps of Example 1, 10.01 grams (0.1 mole) of 2-aminothiazole is reacted with 42.5 grams of the dicarboxylic anhydride by heating in 50 milliliters of dimethylformamide. The crude product, isolated as in Example 1, is recrystallized from toluene to obtain the N-(2-thiazolyl) - 1,2,3,4,9,9 - hexachloro - 1,4,4a,5,6,7,8,8a - octahydro - 1,4 - methanonaphthalene-6,7-dicarboximide product as a solid, melting at 275°–280° C.

Example 3

21.25 grams (0.05 mole) of 1,2,3,4,9,9-hexachloro-1,4,4a,5,6,7,8,8a - octahydro - 1,4 - methanonaphthalene-6,7, - dicarboxylic anhydride and 5.15 grams (0.05 mole) of 5-aminotetrazole monohydrate are dispersed together in 25 milliliters of dimethylformamide and the resulting mixture heated under reflux for 6 hours. The reaction mixture is then cooled and poured into 400 milliliters of cold water to precipitate the product. The resulting aqueous mixture is held at room temperature for 72 hours and then filtered. The filter cake is vacuum-dried to obtain the N-(1H-tetrazol-5-yl) - 1,2,3,4,9,9 - hexachloro-1,4,4a,5,6,7,8,8a - octahydro - 1,4 - methanonaphthalene-6,7-dicarboximide product as a solid, melting at 175°–180° C.

The products of the present invention are useful as parasiticides for the control of insects such as, for example, southern armyworm and as arachnicides for the control of mites such as the two-spotted spider mite. For such uses the compounds conveniently may be dispersed in or on a finely divided inert solid or in a carrier liquid to prepare compositions which facilitate the distribution of a toxic amount of one or more of the compounds on the organisms to be controlled or their habitats.

In representative procedures, the N-(2-pyridyl)-1,2,3,-4,9,9 - hexachloro - 1,4,4a,5,6,7,8,8a - octahydro - 1,4-methanonaphthalene - 6,7 - dicarboximide product was employed as an insecticide for the residual control of southern armyworm larvae on plants. In these precedures, a treating composition was prepared containing the specified product as sole active agent at a concentration of 1 pound of said product per 100 gallons of composition. This treating composition was applied to plants to the point of run-off. Thereafter, the treated plants were held for a period of about 1 week, at which time they were infested with known numbers of southern armyworm larvae. Six days after infestation, the plants were examined and 100 percent kill and control of the southern armyworm larvae was observed. One day later, that is, 14 days following the treatment with the treating composition, the plants were again infested with known numbers of southern armyworm larvae. Six days later, the plants were again examined and it was found that there was again a 100 percent kill and control of the southern armyworm. In similar operations wherein compounds of the invention are applied at concentrations of 3 to 5 pounds per 100 gallons of spray to plants infested with two-spotted spider mites, good controls of the mites is obtained.

The 1,2,3,4,9,9 - hexachloro - 1,4,4a,5,6,7,8,8a - octahydro - 1,4 - methanonaphthalene - 6,7 - dicarboxylic anhydride employed as a starting material in the preparation of the compounds of the present invention is itself prepared in known procedures which comprise the Diels-Alder type reaction of hexachlorocyclopentadiene and tetrahydrophthalic anhydride at a temperature range of 150°–200° C. Preferably, the reaction is carried out in an inert liquid reaction media, for example, a hydrocarbon such as heptaine, toluene, xylene, or ethylbenzene, or a halogenated hydrocarbon, such as chlorobenzene or dichlorobenzene. The reactants are consumed in equimolecular amounts, and are preferably supplied in such amounts. The desired anhydride is obtained as a precipitate in the reaction mixture; this product precipitate can be separated from the reaction mixture, preferably by filtration, and, if desired, purified, as by recrystallization from a suitable solvent.

We claim:

1. A 1,2,3,4,9,9 - hexachloro - 1,4,4a,5,6,7,8,8a - octahydro - 1,4 - methanonaphthalene - 6,7 - dicarboximide bearing a pyridyl, 2-thiazolyl or 5-tetrazolyl substituent on the imide nitrogen.

2. A compound of the formula

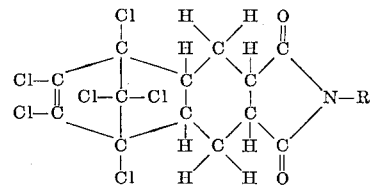

wherein R represents 2-pyridyl, 3-pyridyl, 4-pyridyl, 2-thiazolyl or 5-tetrazolyl.

3. The compound of claim 2 which is N-(2-pyridyl)-1,2,3,4,9,9 - hexachloro - 1,4,4a,5,6,7,8,8a - octahydro-1,4-methanonaphthalene-6,7-dicarboximide.

4. The compound of claim 2 which is N-(2-thiazolyl)-1,2,3,4,9,9 - hexachloro - 1,4,4a,5,6,7,8,8a - octahydro-1,4-methanonaphthalene-6,7-dicarboximide.

5. The compound of claim 2 which is N-(1H-tetrazol-5-yl) - 1,2,3,4,9,9 - hexachloro - 1,4,4a,5,6,7,8,8a-octahydro - 1,4 - methanonaphthalene - 6,7 - dicarboximide.

References Cited

UNITED STATES PATENTS 3,452,045   6/1969   Roberts et al. _____ 260—326
3,476,546  11/1969   Roberts et al. _____ 260—326

ALAN L. ROTMAN, Primary Examiner

U.S. Cl. X.R.

260—306.8, 308, 546, 999